United States Patent
Takizawa et al.

(10) Patent No.: US 11,001,297 B2
(45) Date of Patent: May 11, 2021

(54) ELECTRIC MOTOR CONTROL SYSTEM AND ELECTRIC POWER STEERING APPARATUS THEREWITH

(71) Applicant: Mitsubishi Electric Corporation, Tokyo (JP)

(72) Inventors: Yuji Takizawa, Tokyo (JP); Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 16/070,341

(22) PCT Filed: Mar. 14, 2016

(86) PCT No.: PCT/JP2016/057965
§ 371 (c)(1),
(2) Date: Jul. 16, 2018

(87) PCT Pub. No.: WO2017/158681
PCT Pub. Date: Sep. 21, 2017

(65) Prior Publication Data
US 2019/0023315 A1 Jan. 24, 2019

(51) Int. Cl.
*B62D 5/04* (2006.01)
*H02P 25/22* (2006.01)
(Continued)

(52) U.S. Cl.
CPC ........... *B62D 5/0484* (2013.01); *B62D 5/046* (2013.01); *B62D 5/0487* (2013.01); *H02P 6/12* (2013.01);
(Continued)

(58) Field of Classification Search
CPC .......... H02P 29/68; H02K 11/33; H02K 9/22; H02K 11/02; H01L 23/367; B62D 5/04
See application file for complete search history.

(56) References Cited

U.S. PATENT DOCUMENTS 5,969,919 A * 10/1999 Kobayashi ........... B62D 5/0484
318/281
8,528,689 B2 * 9/2013 Uryu .................... B62D 5/0487
180/446

(Continued)

FOREIGN PATENT DOCUMENTS

JP 2006-223037 A 8/2006
JP 2011-078230 A 4/2011
(Continued)

OTHER PUBLICATIONS

International Search Report for PCT/JP2016/057965 dated May 31, 2016 [PCT/ISA/210].
(Continued)

Primary Examiner — Said Bouziane
(74) Attorney, Agent, or Firm — Sughrue Mion, PLLC; Richard C. Turner (57) ABSTRACT

To provide an electric motor control system and an electric power steering apparatus that torque of the electric motor can be increased for ensuring of steering performance even at the time of abnormality occurrence. The controller is provided with 2 sets of control systems which control a supply current to each set of the windings. When abnormality occurs in one set of the windings and the control system, the electric motor control system sets 0 to supply current to all phase or partial phase windings of abnormality occurrence set, and increase supply current to normal set of the windings up to an irreversible current that increase an irreversible demagnetizing factor of the permanent magnet more than the normal time.

12 Claims, 9 Drawing Sheets

(51) Int. Cl.
*H02P 29/032* (2016.01)
*H02P 6/28* (2016.01)
*H02P 6/12* (2006.01)

(52) U.S. Cl.
CPC ............... *H02P 6/28* (2016.02); *H02P 25/22* (2013.01); *H02P 29/032* (2016.02)

(56) References Cited

U.S. PATENT DOCUMENTS

| | | | | |
|---|---|---|---|---|
| 8,569,981 | B2* | 10/2013 | Nakamura | B62D 5/0403 318/400.02 |
| 9,257,930 | B2* | 2/2016 | Suzuki | H02P 25/22 |
| 2005/0189828 | A1 | 9/2005 | Nakayama et al. | |
| 2006/0138883 | A1* | 6/2006 | Yagai | H02K 3/522 310/71 |
| 2011/0074333 | A1 | 3/2011 | Suzuki | |
| 2011/0156629 | A1* | 6/2011 | Satou | B62D 5/0484 318/453 |
| 2011/0315470 | A1 | 12/2011 | Uryu | |
| 2013/0200827 | A1* | 8/2013 | Kezobo | B62D 5/0487 318/400.21 |
| 2014/0009093 | A1 | 1/2014 | Suzuki | |
| 2014/0062362 | A1* | 3/2014 | Kawai | H02P 3/22 318/400.22 |
| 2015/0130329 | A1* | 5/2015 | Kawashima | H02K 23/32 310/68 C |
| 2016/0065027 | A1* | 3/2016 | Taniguchi | H02K 5/15 310/88 |
| 2018/0062556 | A1* | 3/2018 | Yue | H02M 7/44 |
| 2019/0052218 | A1* | 2/2019 | Sakashita | H02P 7/28 |

FOREIGN PATENT DOCUMENTS

| | | |
|---|---|---|
| JP | 2012-025374 A | 2/2012 |
| JP | 2013-038950 A | 2/2013 |
| JP | 2014-014240 A | 1/2014 |
| WO | 2004/010562 A1 | 1/2004 |

OTHER PUBLICATIONS

Communication dated Nov. 6, 2018, from the Japanese Patent Office in counterpart application No. 2018-505070.

Communication dated May 26, 2020, from the State Intellectual Property Office of the P.R. of China in Application No. 201680083278.7.

Extended European Search Report dated Feb. 27, 2019 issued by the European Patent Office in application No. 16894305.8.

* cited by examiner

ELECTRIC MOTOR CONTROL SYSTEM AND ELECTRIC POWER STEERING APPARATUS THEREWITH

CROSS REFERENCE TO RELATED APPLICATIONS

This application is a National Stage of International Application No. PCT/JP2016/057965 filed Mar. 14, 2016.

TECHNICAL FIELD

The present disclosure relates to an electric motor control system including an electric motor which is provided with a stator equipped with 2 sets of plural phase windings and a rotor equipped with a permanent magnet and drives a steering mechanism of a vehicle, and a controller which controls the electric motor, and an electric power steering apparatus therewith.

BACKGROUND ART

With regard to the above electric motor control system, the technology described in PLT 1 is already known. In the technology of PLT 1, a supply current to 2 sets of the windings provided in the electric motor is controlled by 2 sets of control systems. In the technology of PLT 1, when abnormality occurs in one set, a supply current to the windings of the abnormality occurrence set is set to 0, and drive of the electric motor is continued by performing electric power supply to the normal set of the windings.

CITATION LIST

Patent Literature

PLT 1: JP 2014-14240 A

SUMMARY OF INVENTION

Technical Problem

However, in the technology of PLT 1, in order to reduce a counter electromotive voltage generated in the windings of abnormality occurrence set at the time of abnormality occurrence, a d-axis current is only increased in the negative direction more than the normal time, about the supply current to the normal set of the windings. Torque of the electric motor is decreased to half at the time of abnormality occurrence. Therefore, the steering assistance by the electric motor at the time of abnormality occurrence was not enough. In particular, at the time of low vehicle speed running, there was a problem that handle operation becomes difficult for a powerless driver due to a drop of the assist torque of the electric motor, and evacuation driving becomes difficult. On the other hand, when the supply current to the normal set of the windings is increased from the normal time, an irreversible demagnetizing factor of the permanent magnet increases from the normal time, a magnetic force of the permanent magnet decreases, and replacement of the electric motor 2 is required, Therefore, usually, the supply current is not increased until the irreversible demagnetizing factor increases.

Thus, it is desirable to provide an electric motor control system and an electric power steering apparatus that torque of the electric motor can be increased for ensuring of steering performance even at the time of abnormality occurrence.

Solution to Problem

An electric motor control system according to the present disclosure including:
an electric motor which drives a steering mechanism of a vehicle, and
a controller which controls the electric motor,
wherein the electric motor is provided with a stator equipped with 2 sets of plural phase windings, and a rotor equipped with a permanent magnet, and
wherein the controller is provided with 2 sets of control systems which control a supply current to each set of the windings;
when both sets of the windings and the control systems are normal, the controller distributes and supplies current to 2 sets of the windings; and
when abnormality occurs in one set of the windings and the control system, the controller sets 0 to the supply current to all phase or partial phase windings of an abnormality occurrence set, and increases the supply current to a normal set of the windings up to an irreversible current that increase an irreversible demagnetizing factor of the permanent magnet more than normal time.

An electric power steering apparatus according to the present disclosure is provided with the above electric motor control system.

Advantage of the Invention

When abnormality occurs in one set, the electric motor control system increases the supply current to the normal set of the windings up to the irreversible current that increase the irreversible demagnetizing factor of the permanent magnet more than normal time. Therefore, even at the time of abnormality occurrence, torque of the electric motor can be increased and steering performance can be ensured. Thus, by sacrificing deterioration of irreversible demagnetizing factor, deterioration of the steering performance at the time of abnormality occurrence is suppressed, and priority is given to ensuring of driving performance.

DETAILED DESCRIPTION OF THE EMBODIMENTS

Embodiment 1

Figure 1:
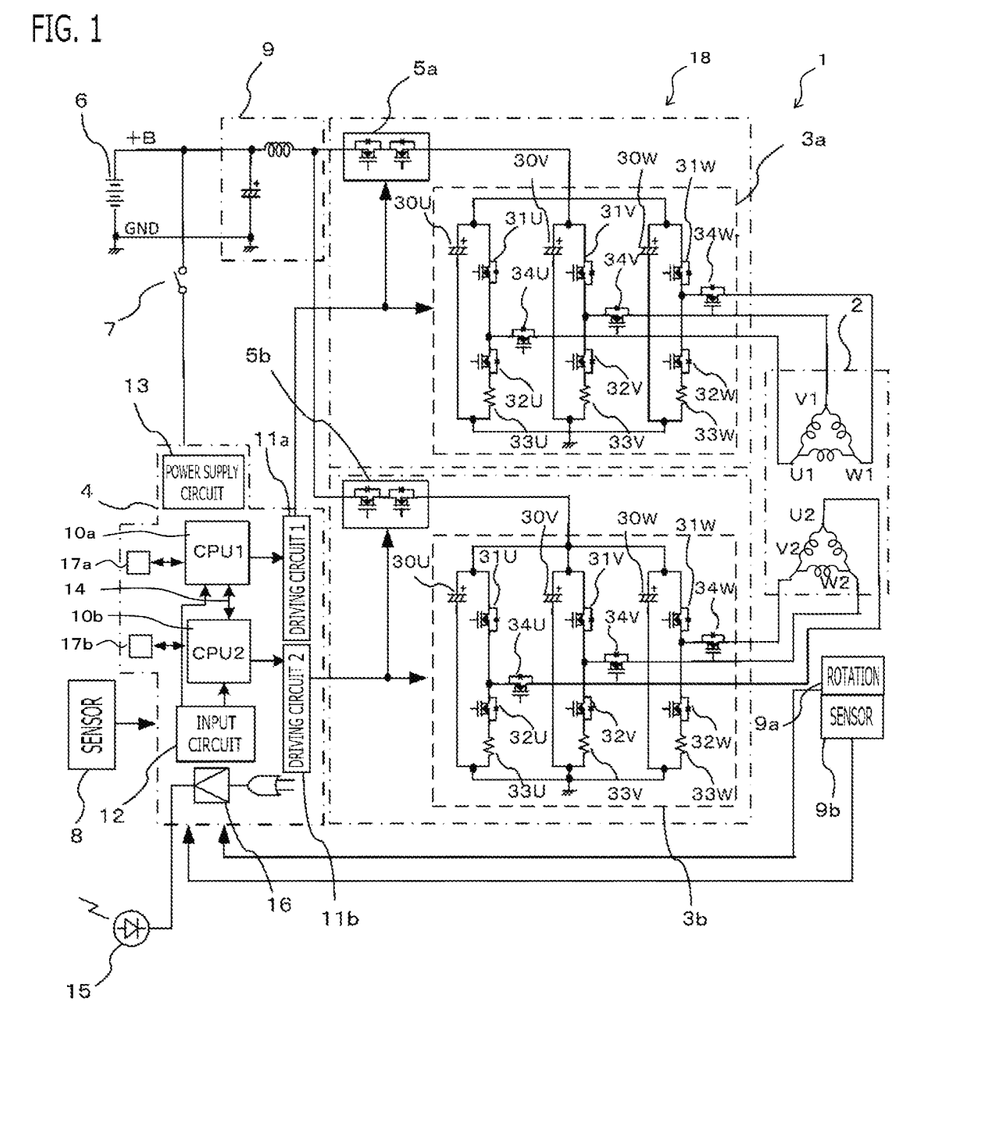
FIG. 1 is a schematic configuration diagram of an electric motor control system according to Embodiment 1.

An electric motor control system 1 according to Embodiment 1 will be explained with reference to drawings. FIG. 1 is a schematic configuration diagram of the electric motor control system 1 according to the present embodiment. The electric motor control system 1 is provided with an electric motor 2 which drives a steering mechanism of a vehicle, and a controller 18 which controls the electric motor 2. That is to say, the electric motor control system 1 performs driving control of the electric motor 2, and steers the handle.

Figure 2:
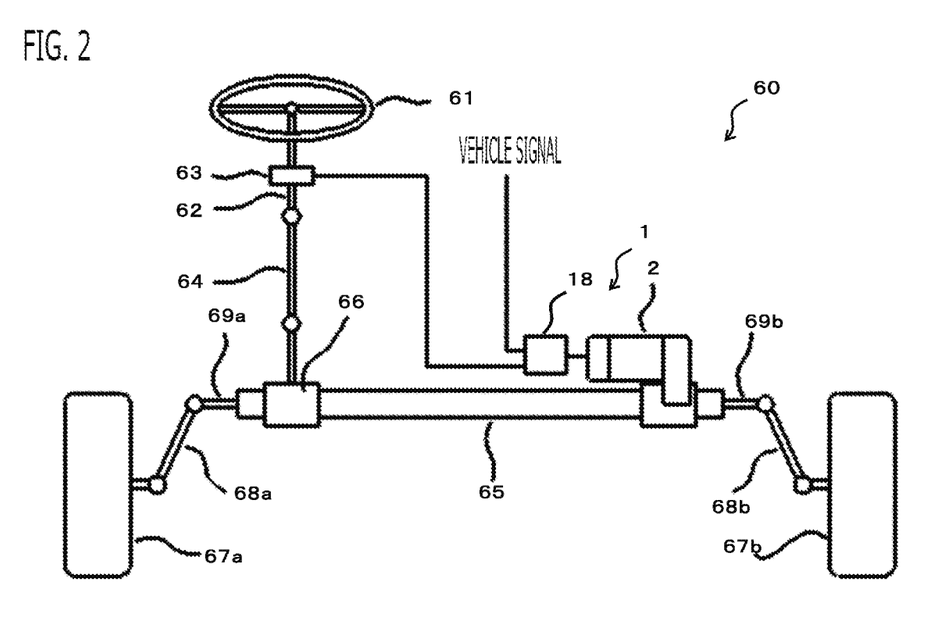
FIG. 2 is a schematic configuration diagram of an electric power steering device according to Embodiment 1.

As shown in FIG. 2, the electric motor control system 1 is built into an electric power steering apparatus 60. The electric power steering apparatus 60 will be explained. A handle 61 which a driver operates is connected with a steering shaft 62. A torque sensor 63 which detects a steering force of the driver is attached to the steering shaft 62. The steering shaft 62 is connected with a pinion gear 66 in a rack shaft 65 via an intermediate shaft 64. Knuckle arms 68a and 68b of front wheels 67a and 67b which are steering control wheels are connected to tie rods 69a and 69b connected with the rack shaft 65. The front wheels 67a and 67b are steered, when a motion of the rack shaft 65 transmits to the front wheels 67a and 67b through the tie rods 69a and 69b and the steering knuckle arms 68a and 68b. The rack shaft 65 is connected with the electric motor 2 via gears, and a rotational driving force of the electric motor 2 is a driving force for driving the rack shaft 65.

In the electric power steering apparatus 60 constituted in this way, when the driver steers the handle 61, a torque signal according to steering is transmitted to the controller 18 from the torque sensor 63, The controller 18 calculates a required assist torque based on vehicle signals, such as the torque signal and vehicle speed, and controls a supply current to the electric motor 2 so that the electric motor 2 outputs the assist torque.

Figure 3:
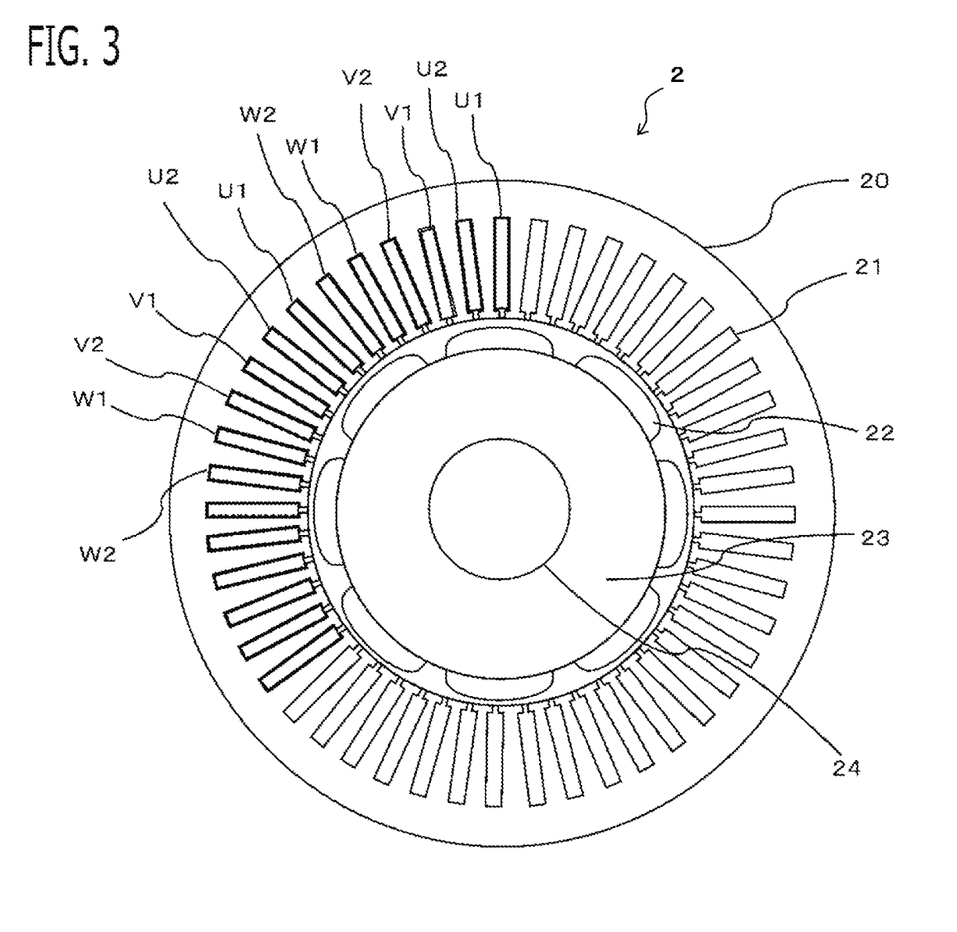
FIG. 3 is a cross-sectional view of an electric motor according to Embodiment 1.

As shown in FIG. 1 and FIG. 3, the electric motor 2 is provided with a stator 20 which has 2 sets of plural phase windings (in this example, three phase windings), and a rotor 23 which has a permanent magnet 22. The electric motor 2 is a brush-less motor whose three phase windings of each set is delta connection, respectively. The electric motor 2 mounts rotation sensors 9a and 9b for detecting rotational position of the rotor. The rotation sensors 9a and 9b are 2 sets of sensors, in order to ensure redundant system, and an output signal of each sensor is inputted into an input circuit 12 of a control circuit 4. 2 sets of sensors may be packed into one package and be mounted in one place, or may be independently mounted in two places. The electric motor 2 may be a brush-less motor whose three phase windings is star connection, or may be a motor with a brush of two poles and two pairs.

FIG. 3 shows a cross-sectional view cut by a plane perpendicular to an axial direction of the electric motor 2. The stator 20 is constituted by laminating thin steel plates in which a plurality of slots 21 (in this example, 48 slots) are arranged circumferentially. The rotor 23 is concentrically arranged in the radial-direct ion inner side of this stator 20. At the outer peripheral part of the rotor 23, the permanent magnets 22 are arranged in order of N pole and S pole in the peripheral direction (in this example, 8 poles). It may not be surface magnet structure, but embedded magnet structure in which the permanent magnets 22 are embedded inside the rotor 23.

An output shaft 24 is provided in the center of the rotor 23, and a gear is allocated in the end of the output shaft 24 and is connected with the steering apparatus of the handle. Therefore, the assist force which assists handle operation is exhibited by the rotational driving force of the output shaft 24. The controller 18 controls the output of the electric motor 2 so that desired assist force is obtained.

A plurality of windings (for example, 4) is arranged at each slot 21 of the stator 20. The winding which extended from each slot 21 is wound, and the left half of FIG. 3 shows those states partially. The first set of windings and the second set of windings are arranged at slot 21 adjacent to each other. For example, the winding of first set of U phase (U1), which is inserted in the predetermined slot 21, extends to outside of the slot 21, and then is again inserted in the 6th slot 21 beyond five slots. In the slot 21 adjacent to the first set of U phase (U1), the winding of the second set of U phase (U2) is inserted; in the slot 21 adjacent to U2, the winding of the first set of V phase (V1) is inserted; in the slot 21 adjacent to V1, the winding of the second set of V phase (V2) is inserted; in the slot 21 adjacent to V2, the winding of the first set of W phase (W1) is inserted; and in the slot 21 adjacent to W1, the winding of the second set of W phase (W2) is inserted. In this way, the windings are inserted regularly. Thus, 2 sets of the windings are alternately wound in the peripheral direction, and are distributed winding with a preliminarily set phase difference (in this example, 7.5 degrees).

Each set of windings are connected so that the end of each phase winding becomes delta connection. There are three ends of windings in each set, and three ends of each set are connected to the corresponding set of inverter 3a and 3b independently (in this example, switching devices 34 for motor relay). Although 2 sets of the windings are distributed in the peripheral direction of one stator, it may be so-called a tandem type motor which arranges a stator equipped with the first set of windings and a stator equipped with the second set of windings in series for one rotor. However, as compared with a single type, the tandem type motor may become long in the axial direction, and mountability may be deteriorated.

The controller 18 is provided with 2 sets of control systems which control the supply current to each set of the windings. The controller 18 is provided with 2 sets of inverters 3a and 3b which supply AC power to each set of the three phase windings, and a control circuit 4 which controls each set of the inverters 3a and 3b. The first set of inverter 3a converts DC power supplied from the DC power source 6 (in this example, vehicle battery) into AC power, and supplies to the first set of windings U1, V1, and W1. The second set of inverter 3b converts DC power supplied from the DC power source 6 into AC power, and supplies to the second set of windings U2, V2, and W2. Power is supplied to a power supply circuit 13 of the control circuit 4 from the DC power source 6 via an ignition switch 7.

The first set of inverter 3a is provided with three sets of a series circuit (leg) where a positive electrode side switching device 31 (upper arm) connected to the positive electrode terminal of the DC power source 6 and a negative electrode side switching device 32 (lower arm) connected to the negative electrode terminal of the DC power source 6 are connected in series, corresponding to respective phase of the three phase windings. Thus, the first set of inverter 3a is provided with a total of six switching devices for power conversion of the three positive electrode side switching devices 31U, 31V, and 31W and the three negative electrode side switching devices 32U, 32V, and 32W. A free-wheel diode is connected in inverse parallel to each switching device. Then, a connection node of the positive electrode side switching device 31 and the negative electrode side switching device 32 of each phase is connected to the winding of the corresponding phase in the first set of windings U1, V1, and W1. On a wire connecting between the connection node of switching devices and the winding of each phase, a switching device 34U, 34V, and 34W for motor relay as a relay circuit is provided, respectively. A shunt resistance 33U, 33V, and 33W for current detection is provided in the series circuit (leg) of each phase, respectively. The both-ends potential difference of the shunt resistance 33U, 33V, and 33W is inputted into the control circuit 4, respectively. On a power source line from the DC power source 6 to the first set of inverter 3a, a switching device 5a for power source relay of first set is provided. The switching device 31U, 31V, 31W, 32U, 32V, 32W, 34U, 34V, 34W, and 5a is turned on and off by a control signal outputted from a first driving circuit 11a of the control circuit 4, respectively.

The second set of inverter 3b is constituted similar to the first set of inverter 3a. That is to say, the second set of inverter 3b is provided with six switching devices 31U, 31V, 31W, 32U, 32V, and 32W for power conversion, switching devices 34U, 34V, and 34W for motor relay, shunt resistances 33U, 33V, and 33W, and a switching device 5b for power source relay of second set. The switching device 31U, 31V, 31W, 32U, 32V, 32W, 34U, 34V, 34W, and 5b is turned on and off by a control signal outputted from a second driving circuit 11b of the control circuit 4, respectively.

Figure 4:
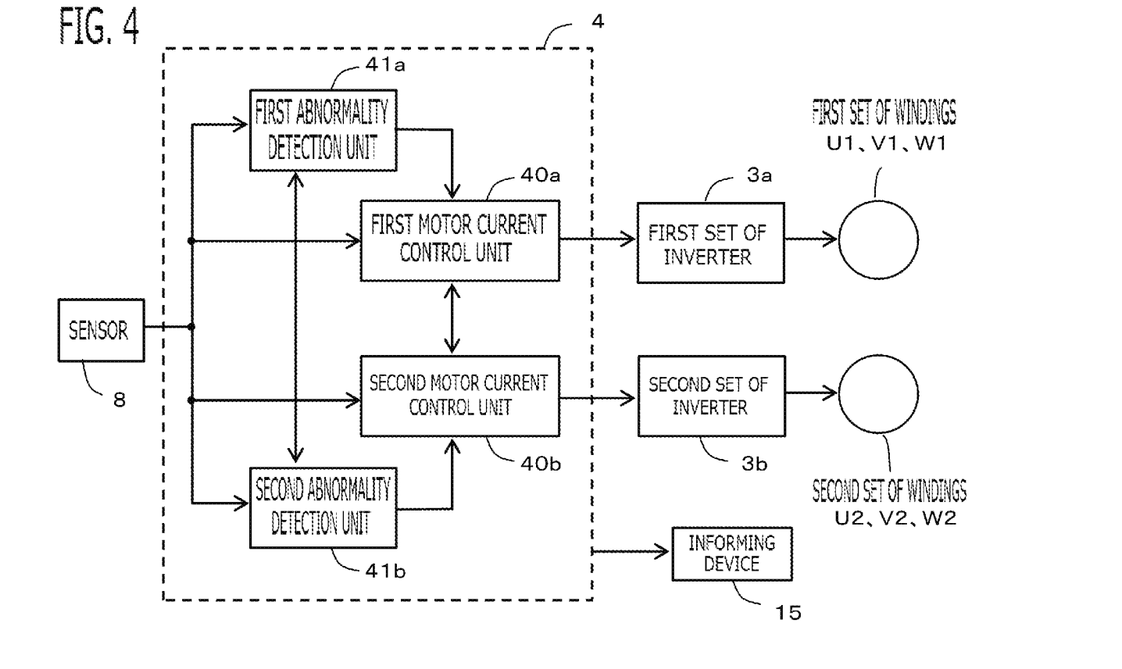
FIG. 4 is a schematic block diagram of a control circuit according to Embodiment 1.

As shown in FIG. 4, the control circuit 4 is provided with a first motor current control unit 40a that controls current supplied to the first set of windings U1, V1, and W1 by controlling the first set of inverter 3a, a second motor current control unit 40b that controls current supplied to the second set of windings U2, V2, and W2 by controlling the second set of inverter 3b, a first abnormality detection unit 41a that detects abnormality of the first set of control system, and a second abnormality detection unit 41b that detects abnormality of the second set of control system.

Respective functions of control units 40a, 40b, 41a, 41b, and the like of the control circuit 4 are realized by processing circuits included in the control circuit 4. In the present embodiment, as shown in FIG. 1, the control circuit 4 includes, as processing circuits, a arithmetic: processor 10 (computer) such as a CPU (Central Processing Unit), storage apparatuses 17 that exchange data with the arithmetic processor 10, an input circuit 12 that inputs external signals to the arithmetic processor 10, an output circuit that outputs signals from the arithmetic: processor 10 to the outside, and the like. As the storage apparatuses 17, there are provided a RAM (Random Access Memory) which can read data and write data from the arithmetic processor 10, a ROM (Read Only Memory) which can read data from the arithmetic processor 10, and the like. The input circuit 12 is connected with various kinds of sensors and switches and is provided with an A/D converter and the like for inputting output signals from the sensors and the switches to the arithmetic processor 10. The output circuit is connected with electric loads such as a driving circuit 11 that drive on/off of the switching devices and an informing device driving circuit 16; and is provided with a driving circuit and the like for outputting a control signal from the arithmetic processor 10. In the present embodiment, the input circuit 12 is connected with various sensors 8, such as the shunt resistances 33 as current sensors, the rotation sensors 9a and 9b, the voltage sensors of the DC power source and the winding terminals, the torque sensor 63 for detecting the steering wheel torque of the handle, and a vehicle speed sensor for detecting the travelling speed of the vehicle. The driving circuit 11 is connected with each switching device.

Then, the arithmetic processor 10 runs software items (programs) stored in the storage apparatus 17 such as a ROM and collaborates with other hardware devices in the control circuit 4, such as the storage apparatus 17, the input circuit 12, and the output circuit, so that the each function of the control units 40a, 40b, 41a, and 41b provided in the control circuit 4 are realized.

In the present embodiment, in the control circuit 4, the first set of control system and the second set of control system are independent of each other. As processing circuits which realizes function of the first motor current control unit 40a and the first abnormality detection unit 41a concerning the first set of control system, the control circuit 4 is provided with a first arithmetic processor 10a (in this example, CPU1), a first storage apparatus 17a only for the first arithmetic processor 10a, and a first driving circuit 11a only for the first arithmetic processor 10a. As processing circuits which realizes function of the second motor current control unit 40b and the second abnormality detection unit 41b concerning the second set of control system, the control circuit 4 is provided with a second arithmetic processor 10b (in this example, CPU2), a second storage apparatus 17b only for the second arithmetic processor 10b, and a second driving circuit 11b only for the second arithmetic processor 10b. The first arithmetic processor 10a and the second arithmetic processor 10b are connected by a communication line 14, and can transmit information with each other. The input circuit 12 is commonly used for the first and second arithmetic processors 10a and 10b. The control circuit 4 is provided with the common informing device driving circuit 16 for driving an informing device 15.

The first and second motor current control units 40a and 40b calculate the assist torque which the electric motor 2 outputs, based on the vehicle speed and the steering wheel torque detected based on the output signal of the torque sensor 63, Then, each of the first and second motor current control units 40a and 40b calculates a current command of each set of the windings, based on a divided assist torque obtained by multiplying a dividing ratio of each set (½ at normal time) to the assist torque, respectively, Each of the first and second motor current control units 40a and 40b controls on/off of each set of the switching devices by current feedback control using the vector control method, respectively.

In detail, each of the first and second motor current control units 40a and 40b calculates dq-axis current commands represented in a dq-axis rotating coordinate system, based on the divided assist torque, respectively. In the present embodiment, the dq-axis current commands are calculated, according to the maximum torque current control method that calculates the dq-axis current commands which maximize the generated torque for the same current. The dq-axis rotating system consists of a d-axis defined in the direction of the N pole (magnetic pole position) of the permanent magnet provided in the rotor and a q-axis defined in the direction advanced to d-axis by 90 degrees (n/2) in an electrical angle, and which is the two-axis rotating coordinate system which rotates synchronizing with rotation of the rotor in the electrical angle.

Each of the first and second motor current control units 40a and 40b calculates the dq-axis voltage commands by proportional-integral control and the like, based on a deviation between current commands and actual currents, in the dq-axis (2 phases) rotating coordinate system; and calculates three phase voltage commands by performing a fixed coordinate conversion and a two-phase/three-phase conversion to the dq-axis voltage commands, respectively. Then, each of the control units perform PWM (Pulse Width Modulation) controls that change a duty ratio of rectangular pulse wave signal which turns on or turns off the switching devices of each phase by comparing the three phase voltage commands with a carrier, respectively.

Each of the first and second abnormality detection units 41a and 41b detects abnormality of each set of control systems, such as inverters 3a and 3b and windings, from sensor information, such as current detecting values, respectively. When abnormality is detected, each of the first and second motor current control units 40a and 40b, about the set in which abnormality occurred, turns off the switching devices 34 for motor relay of all phases or phase in which abnormality occurred; shuts down current supply to the windings of all phases or phase in which abnormality occurred; and prevents a counter electromotive force generated by rotation of the electric motor 2 from being applied to the inverter 3a and 3b. When the switching devices 34U, 34V, and 34W for motor relay of all phases of the abnormality occurrence set are turned off, it becomes unnecessary to consider the counter electromotive force generated in the windings of the abnormality occurrence set.

Alternatively, each of the first, and second motor current control units 40a and 40b may turn off the switching device 5a and 5b for power source relay of the set in which abnormality occurred. Or, each of the first and second motor current control units 40a and 40b may set 0 to the current commands of the set in which abnormality occurred, or may turn off the switching devices of the upper and lower arms of the inverter 3a and 3b of the set in which abnormality occurred. When abnormality is detected, each of the first and second abnormality detection units 41a and 41b supplies power and turns on the informing device 15, such as a lamp, via the informing device driving circuit 16; and informs that abnormality of one set occurred. The switching device 5a and 5b for power source relay may be included in the inverter 3a and 3b, respectively.

Each of the first and second arithmetic processors 10a and 10b monitors a mutual operating state by mutual information transfer through the communication line 14, respectively. For example, the first arithmetic processor 10a (the first abnormality detection unit 41a) transmits that the first arithmetic processor 10a detected abnormality of the first control system and turned off the predetermined switching devices, to the second arithmetic processor 10b (the second motor current control unit 40b). When each of the first and second arithmetic processors 10a and 10b could not transmit and receive periodical signal transmission using a predetermined format from the other, each of the first and second arithmetic processors 10a and 10b determines that abnormality has occurred in the other arithmetic processor, and determines that current supply of the other control system has stopped, respectively. When each of the first and second arithmetic processors 10a and 10b detects abnormality of own or the other arithmetic processor, each of the first and second arithmetic processors 10a and 10b informs that abnormality has occurred via the informing device 15, respectively, Next, abnormality detection processing will be explained along with flowchart of FIG. 5. Since the first and second arithmetic processors 10a and 10b perform similar processing, processing of the first arithmetic processor 10a is explained as a representative.

Figure 5:
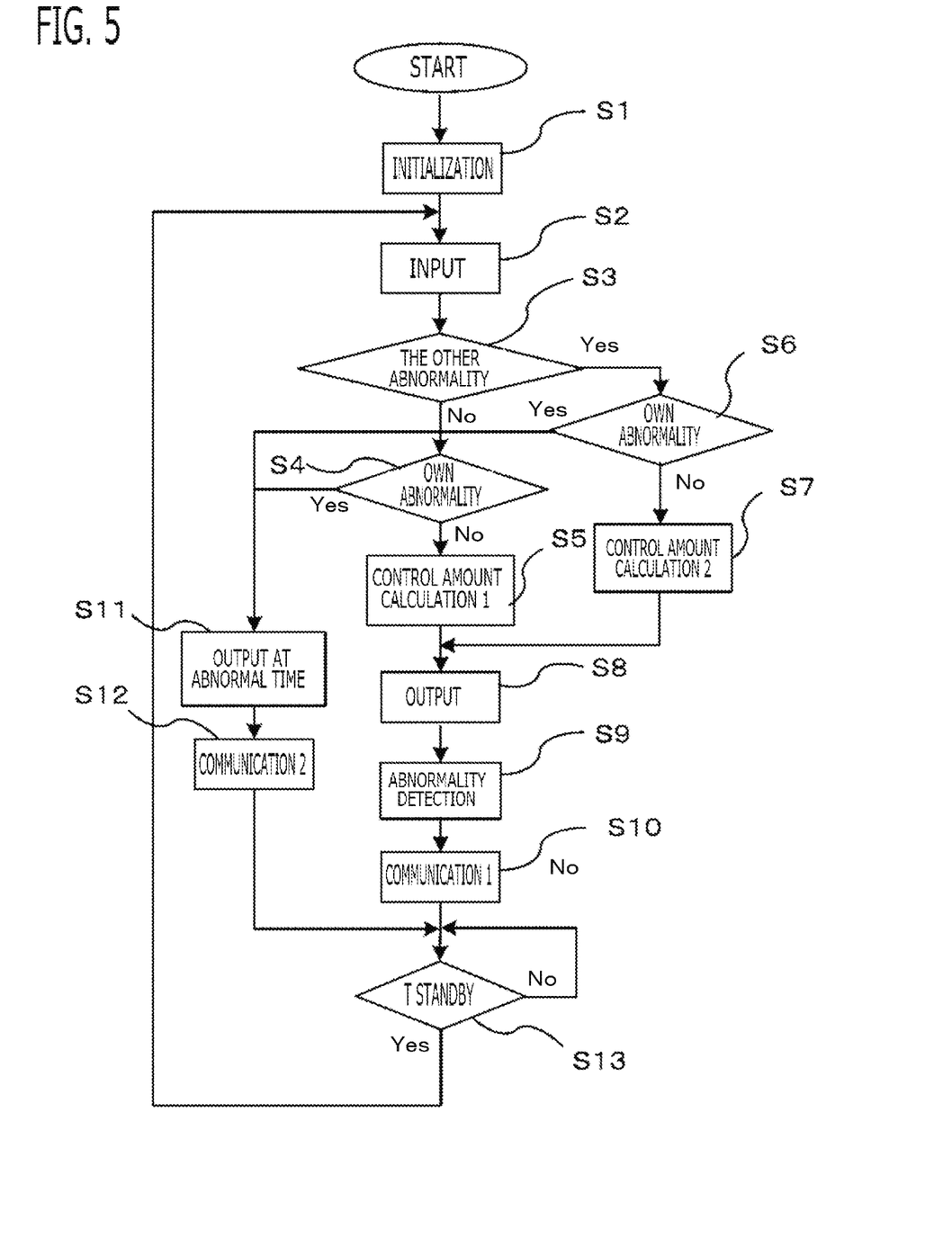
FIG. 5 is a flowchart for explaining processing of a control circuit according to Embodiment 1.

When the ignition switch 7 is turned on, power is supplied to the first arithmetic processor 10a, and the first arithmetic processor 10a starts processing of each control unit. First, in the step S1, the first arithmetic processor 10a initializes RAM memory, ROM memory, input/output port, and the like. Next, in the step S2, the first motor current control unit 40a obtains various kinds of information inputted via the input circuit 12, and stores it in RAM memory. In that information, the communications data of the other second arithmetic processor 10b is also included.

In the step S3, the first abnormality detection unit 41a checks presence/absence of abnormality detection of the other second set of control system. The presence/absence of abnormality of the second set of control system can be determined by decoding communications data with the second arithmetic processor 10b. When abnormality does not occur in the second set of control system (No), the first abnormality detection unit 41a advances to the step S4 and checks presence/absence of abnormality detection of the own first set of control system. When abnormality of the first set of control system is not detected (No), the first motor current control unit 40a advances to the step S5 and calculates normal control amount 1 for when abnormality of the first set and second set of control systems does not occur.

On the other hand, in the step S3, when abnormality occurs in the other second set of control system (Yes), the first abnormality detection unit 41a advances to the step S6 and checks presence/absence of abnormality detection of the own first set of control system, as well as the step S4. When abnormality occurs in the first set of control system (Yes), the first motor current control unit 40a advances to the step S11 and performs processing at the own abnormal time. When there is no abnormality in the first set of control system (No), the first motor current control unit 40a advances to the step S7 and calculates control amount 2 in conditions of abnormal in the other and normal in own, and then advances to the step S8.

When it is judged that abnormality occurs in the first set of control system, in the step S4 or the step S6, the first motor current control unit 40a advances to the step S11 and outputs a control signal so as to stop output of the first driving circuit 11a. The first motor current control unit 40a may classify into plural levels based on the abnormality content which occurred. For example, when ground fault or power short-circuit occurs in the winding of the electric motor 2 or the switching device of the inverter 3a, the first motor current control unit 40a outputs control signal so as to turn off all switching devices including the switching device 5a for power source relay. When open failure occurs in any one of the switching-devices of the upper and lower arms of the inverter 3a or any one of the switching devices 34 for motor relay, the first motor current control unit 40a can also stop the drive of the switching device of only the phase which abnormality occurs, and output control command to other phases as usual. Therefore, in the step 11, besides abnormal time processing which stops all, processing which continues a part of control can be performed. Since processing which calculates control amount is also required when two phases can be driven as described above, it may be more efficient to process in the steps S5 and S7.

Next, in the step S12, the first abnormality detection unit 41a transmits abnormal condition data of the first set of control system using the communication line 14, This transmitting data also includes abnormality level, for example all switching devices are off state. Although this data can also include a ratio obtained by comparing control amount at the time of turning off only a certain phase with control amount at the normal time, communication of such the abnormality content can also be processed through the step S9 and the step S10. Accordingly, the other can grasp the abnormality content. Therefore, the own control amount can be corrected and outputted according to the other abnormality.

Next, a calculation method of control amount at the normal time when abnormality does not occur in the first set and second set of control system in the step S5 will be explained. In the step S5, the first motor current control unit 40a calculates current value required to the electric motor 2 based on the steering wheel torque and the vehicle speed, and sets one half of the required current value of the electric motor 2 to current command of the first set of windings. In the present embodiment, the first motor current control unit 40a calculates the current command of the first set of windings for outputting one half of the assist torques calculated based on the steering wheel torque and the vehicle speed.

On the other hand, in the step S7, since abnormality occurs in the other second set of control system, it is necessary to calculate the current command of the first set of windings as the control amount 2, considering abnormality of the second set. For example, when current supply of all phases of the second set is stopped, the first motor current control unit 40a sets the required current value of the electric motor 2 to the current command of the first set of windings. When current supply to one phase of the second set is stopped, the first motor current control unit 40a sets two thirds of the required current value of the electric motor 2 to the current command of the first set of windings. In the present embodiment, when current supply to all phases of the second set is stopped, the first motor current control unit 40a calculates the current command of the first set of windings for outputting the assist torque. When current supply of one phase of the second set is stopped, the first motor current control unit 40a calculates the current command of the first set of windings for outputting two thirds of the assist torques.

Next, in the step S8, the first motor current control unit 40a outputs control command which controls on/off of each switching device of the first set by current feedback control and PWM control, based on the current command of the first set of windings. In the step S9, the first abnormality detection unit 41a determines presence/absence of abnormality of the first set of control system. Specifically, the first abnormality detection unit 41a detects current, which flows when each switching device is turned on and off, by each shunt resistance 33, and determines abnormal part by determining whether or not the current value is normal. The first abnormality detection unit 41a detects winding terminal voltages of the electric motor 2, and determines abnormal part by determining whether or not predetermined voltage appears according to turning on and off of the switching devices. When actual current does not approach the current command even if a predetermined time elapses, the first abnormality detection unit 41a can also determine as abnormal since there is possibility of an electric leakage.

The first abnormality detection unit 41a memorizes the abnormal condition, and communicates the abnormal condition to the second arithmetic processor 10b via the communication line 14 in the step S10. If there is other necessary information, it is efficient to transmit it by including in this processing. For example, it is also possible to transmit and receive information on the input circuit 12 and control amount information, and to check accuracy of control amount calculation with each other.

Next, in step S13, the first arithmetic processor 10a waits until a predetermined time (for example, 5 m seconds) elapses. When the predetermined period elapses (Yes), the first arithmetic processor 10a returns to the step S2, and processes in the similar procedure again. The second arithmetic processor 10b also performs the similarly processing operation of the above mentioned first arithmetic processors 10a, and forms double redundant system.

Therefore, in the normal state without abnormality, each arithmetic processor 10a and 10b takes charge of one half of the required current value of the electric motor 2, and controls the electric motor 2. When abnormality occurs in one side, the normal arithmetic processor can also take charge of the required current value of the electric motor 2 of the control system which abnormality occurred, and can control the electric motor 2. It is possible to add a function to inform abnormality of not only own control system but also the other control system; the information to the driver at the time of abnormality occurrence becomes certain; and it can inform which control system is abnormal. For example, this abnormality information is performed in the step S10 or the step S12, based on the output of the step S9 or the step S11 at the abnormal time.

The first system and the second system are arranged with 30 degrees deviation in electrical angle as shown in FIG. 3; and in driving of the electric motor 2, the first system and the second system need to shift output of the control command in accordance with this structure. Noise and vibration can be reduced by this 30 degrees phase difference control.

In the present embodiment, when both sets of the windings and the control systems are normal, the motor current control units 40a and 40b distribute and supply current to 2 sets of the windings. When abnormality occurs in one set of the windings and the control system, the motor current control units 40a and 40b set 0 to the supply current to all phase or partial phase windings of abnormality occurrence set, and increase the supply current to the normal set of the windings up to an irreversible current that increase an irreversible demagnetizing factor of the permanent magnet more than normal time.

According to this configuration, a volume of magnet which irreversible demagnetization causes becomes larger than the normal time, and a region where irreversible demagnetization causes decreases output torque rather than the normal time. But, the region where irreversible demagnetization causes is limited to a region where a permeance coefficient is small, for example near the both circumferential ends of the magnet where air gap is large and magnet thickness is small. Therefore, most regions where irreversible demagnetization does not cause can increase output torque by increasing the supply current. Consequently, as the whole of the electric motor 2, torque can be increased by increasing the supply current more than the normal time up to irreversible current. In the present embodiment, the motor current control units 40a and 40b increase the supply current up to irreversible current in which the irreversible demagnetizing factor of the permanent magnet increases by at least 10% or more compared with the normal time (for example, the flux linkage of the permanent magnet decreases by 10% or more compared with the normal time).

Figure 10:
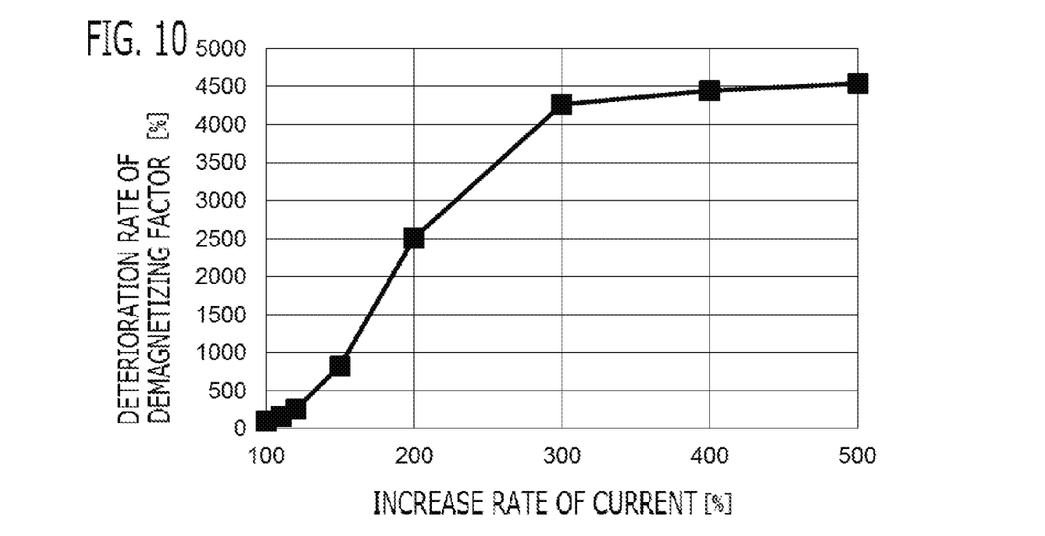
FIG. 10 is a figure showing a deterioration rate of demagnetizing factor according to Embodiment 5.

FIG. 10 shows a demagnetizing factor when the supply current to the normal set of the windings is increased more than the normal time at the time of abnormality occurrence, in the surface magnet type motor of 10 poles 12 slots of Embodiment 5 described below. The horizontal axis of FIG.

10 shows an increase rate of current at the abnormal time to current at the normal time (current at the abnormal time/current at the normal time×100%). The vertical axis of FIG. 10 shows a deterioration rate of irreversible demagnetizing factor at the abnormal time to irreversible demagnetizing factor at the normal time (demagnetizing factor at the abnormal time/demagnetizing factor at the normal time× 100%). Generally, the demagnetizing factor at the normal time is within the range from 0. several percent to several percent. For example, when the demagnetizing factor at the normal time is 1%, the irreversible demagnetizing factor at the abnormal time becomes 10% at 1000% of the deterioration rate of the demagnetizing factor, and the irreversible demagnetizing factor at the abnormal time becomes 50% at 5000% of the deterioration rate of the demagnetizing factor. As the increase rate of current increases, the demagnetizing factor at the abnormal time increases; and when the increase rate of current increases more than 300%, the deterioration rate of the demagnetizing factor becomes almost constant.

Figure 11:
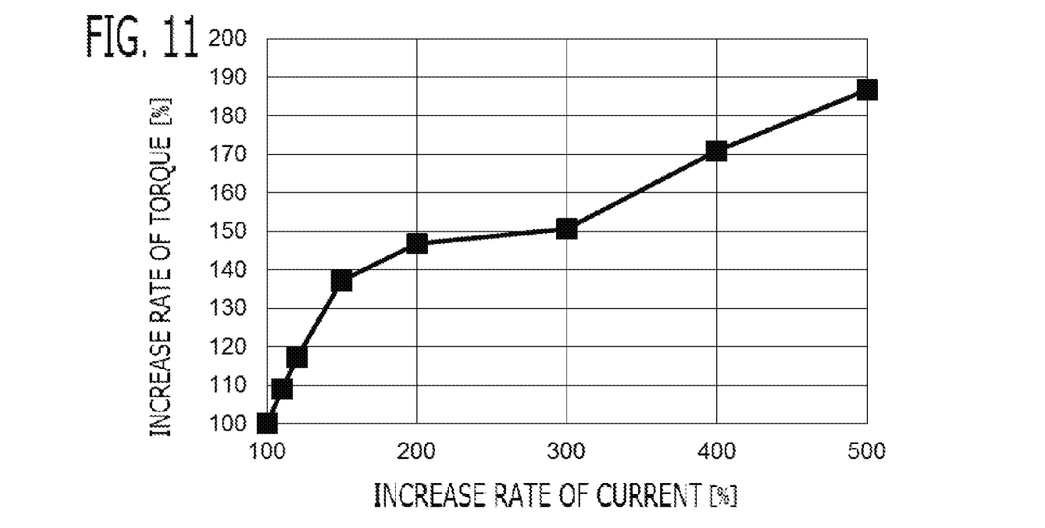
FIG. 11 is a figure showing an increase rate of torque according to Embodiment 5.

FIG. 11 shows an increase rate of torque in the case of FIG. 10. The horizontal axis of FIG. 11 shows the increase rate of current at the abnormal time to the current at the normal time, as well as the horizontal axis of FIG. 10. The vertical axis of FIG. 11 shows an increase rate of torque of the electric motor 2 at the abnormal time to torque of the electric motor 2 at the time when abnormality occurs and the increase rate of current is 100% (torque at the abnormal time/torque at the time of abnormal and 100% increase rate of current×100%). Although the deterioration rate of the demagnetizing factor of FIG. 10 is deteriorated as the increase rate of current increases, the part of permanent magnet where the irreversible demagnetization does not cause increases output torque. Therefore, for example, since the increase rate of torque exceeds 140% at 200% of the increase rate of current, 70% of the torque at the normal time can be outputted. If 70% of the torque at the normal time can be outputted, most of steering by the driver can be covered.

Unlike the present embodiment, in the case of not increasing the supply current to the normal set at the time of abnormality occurrence so that irreversible demagnetizing factor is not deteriorated, or in the case of limiting increase in the supply current of the normal set at the time of abnormality occurrence, although deterioration of irreversible demagnetizing factor can be prevented, torque of the electric motor 2 drops at the time of abnormality occurrence, and steering performance is deteriorated. Thus, in the present embodiment, by sacrificing deterioration of irreversible demagnetizing factor, deterioration of the steering performance at the time of abnormality occurrence is suppressed, and priority is given to ensuring of driving performance.

In the present embodiment, the motor current control units 40a and 40b increase up to an irreversible current that torque of the electric motor 2 does not drop by an excessive increase of the volume of magnet which irreversible demagnetization causes by increase in the supply current. Specifically, the motor current control units 40a and 40b upper-limit the supply current to the normal set of the windings which is increased at the time of abnormality occurrence by a preliminarily set upper limit irreversible current. The upper limit irreversible current is preliminarily set to a supply current in which torque of the electric motor 2 becomes the maximum to the increase in the supply current, by a balance between a characteristic that the volume of magnet which irreversible demagnetization causes increases as the supply current increases, and a characteristic that torque of the electric motor 2 increases as the supply current increases.

However, when the supply current to the normal set of the windings is increased more than the normal time at the time of abnormality occurrence, heating amount of the normal set of the windings and the switching devices increase more than the normal time. In the present embodiment, since a cooling performance of the electric motor 2 is designed corresponding to the time of abnormality occurrence, and a temperature rise of the windings and the switching devices at the time of abnormality occurrence can be suppressed, the supply current can be increased up to the irreversible current continuously.

And, in the present embodiment, since the windings are distributed winding as mentioned above, and a magnetomotive force harmonic wave of the stator becomes small compared with concentrated winding when the supply current to the windings of the abnormality occurrence set is set to 0, vibration and noise of the electric motor 2 can be reduced. Therefore, uneasy feeling given to the driver by vibration and noise becoming large suddenly at the time of abnormality occurrence can be reduced, and change of the steering feeling can be reduced. Especially, when the irreversible demagnetization of the permanent magnet causes, the magnetomotive force harmonic wave of the rotor becomes large, and vibration and noise become large easily, but even if torque is increased, increase in vibration and noise can be suppressed. On the other hand, since the driver hardly notices abnormality, it is preferable to inform abnormality to the driver by the informing device 15, as mentioned above.

Embodiment 2

The electric motor control system 1 according to Embodiment 2 will be explained. The explanation for constituent parts the same as those in Embodiment 1 will be omitted. The basic configuration of the electric motor control system 1 according to the present embodiment is the same as that of Embodiment 1; however, Embodiment 2 is different from Embodiment 1 in that the supply current to the normal set of the windings is increased considering the cooling performance of the electric motor 2.

The electric motor 2 according to the present embodiment does not have enough cooling performance for increase in heating amount of the normal set of the windings at the time of abnormality occurrence. Therefore, if the supply current is increased up to irreversible current continuously, temperature of the normal set of the windings rises too much, and there is a possibility of exceeding allowable temperature. Then, when abnormality occurs, after increasing the supply current to the normal set of the windings up to irreversible current, the motor current control units 40a and 40b decrease gradually.

According to this configuration, a winding temperature of the normal set can be prevented from rising too much by increasing the supply current up to irreversible current continuously. For example, at the time of abnormality occurrence, the motor current control units 40a and 40b upper-limit supply current (current command) of the normal set of the windings, which is set according to the assist torque, by an upper limit current. An initial value of the upper limit current is set to irreversible current, such as the upper limit irreversible current mentioned above, for example. Then, when a period in which the supply current of the normal set of the windings is increasing within a preliminarily set current range of irreversible current (for example, greater than or equal to a minimum value of irreversible current) exceeds a preliminarily set determination period, the motor current control units 40*a* and 40*b* decrease the upper limit current gradually to a preliminarily set final value with a preliminarily set slope. According to this configuration, the determination period can limit a period in which the supply current of the normal set is increased, and the winding temperature of the normal set can be prevented from rising too much. Since the supply current of the normal set decreases gradually forcibly after the determination period elapses, rapid deterioration of steering performance can be prevented.

After decreasing gradually the supply current to the normal set of the windings, the motor current control units 40*a* and 40*b* permit increasing up to irreversible current again. According to this configuration, when the assist torque increases by handle operation of the driver again after the winding temperature of the normal set dropped, the supply current of the normal set is increased and steering-performance can be ensured. For example, after decreasing the upper limit current to the final value, the motor current control units 40*a* and 40*b* return the upper limit current to the initial values, such as the upper limit irreversible current, and permit increasing the supply current to the normal set of the windings up to irreversible current.

Embodiment 3

The electric motor control system 1 according to Embodiment 3 will be explained. The explanation for constituent parts the same as those in Embodiment 1 will be omitted. The basic configuration of the electric motor control system 1 according to the present embodiment is the same as that of Embodiment 1; however, Embodiment 3 is different from Embodiment 1 in that the supply current to the normal set of the windings is increased considering the cooling performance of the electric motor 2.

The electric motor 2 according to the present embodiment does not have enough cooling performance for increase in heating amount of the normal set of the windings at the time of abnormality occurrence, as is the case with Embodiment 2. In the present embodiment, after decreasing gradually the supply current to the normal set of the windings, the motor current control units 40*a* and 40*b* prohibit increasing up to irreversible current again. According to this configuration, by prohibiting increasing up to irreversible current again, it is not necessary to decrease the supply current again after increase in the supply current of the normal set of the windings, and continuous assistance by half assist torque can be performed.

For example, at the time of abnormality occurrence, the motor current control units 40*a* and 40*b* upper-limit the supply current (current command) of the normal set of the windings, which is set according to the assist torque, by the upper limit current, as is the case with Embodiment 2 mentioned above. The initial value of the upper limit current is set to irreversible current, such as the upper limit irreversible current mentioned above, for example. Then, when a period in which the supply current of the normal set of the windings is increasing within a preliminarily set current range of irreversible current (for example, greater than or equal to a minimum value of irreversible current) exceeds a preliminarily set determination period, the motor current control units 40*a* and 40*b* decrease the upper limit current gradually up to a preliminarily set final value with a preliminarily set slope. Then, after decreasing the upper limit current up to the final value, the motor current control units 40*a* and 40*b* sets the upper limit current to the maximum current at the normal time. Especially, when the final value is set significantly lower than the maximum current of the normal time since the cooling performance of the electric motor 2 is largely insufficient, the supply current of the normal set drops less than the supply current at the normal time after increase, and steering performance is temporarily deteriorated. According to above configuration, while ensuring once an avoidance operation in which the supply current is increased up to irreversible current, temporary deterioration of the steering performance after the avoidance operation can be limited to only once.

Embodiment 4

The electric motor control system 1 according to Embodiment 4 will be explained. The explanation for constituent parts the same as those in Embodiment 1 will be omitted. The basic configuration of the electric motor control system 1 according to the present embodiment is the same as that of Embodiment 1; however, Embodiment 4 is different from Embodiment 1 in processing after the electric motor control system 1 stops.

In the present embodiment, when abnormality occurs, the motor current control units 40*a* and 40*b* do not restart the electric motor control system 1 again, after the electric motor control system 1 stops once. When the supply current to the normal set of the windings is increased up to irreversible current at the time of abnormality occurrence, magnetic force of the permanent magnet drops by irreversible demagnetization. The steering assistance by the electric motor control system 1 is performed until the vehicle stops at place where vehicle check and maintenance are possible, the ignition switch 7 is turned off, and the electric motor control system 1 stops. After that, the steering assistance by the electric motor 2 is not performed since abnormality occurs in the system and the magnetic force of the permanent magnet drops.

Embodiment 5

The electric motor control system 1 according to Embodiment 5 will be explained. The explanation for constituent parts the same as those in Embodiment 1 will be omitted. The basic configuration of the electric motor control system 1 according to the present embodiment is the same as that of Embodiment 1; however, Embodiment 5 is different from Embodiment 1 in that the control circuit 4 is constituted by one CPU, and in the winding method.

Figure 6:
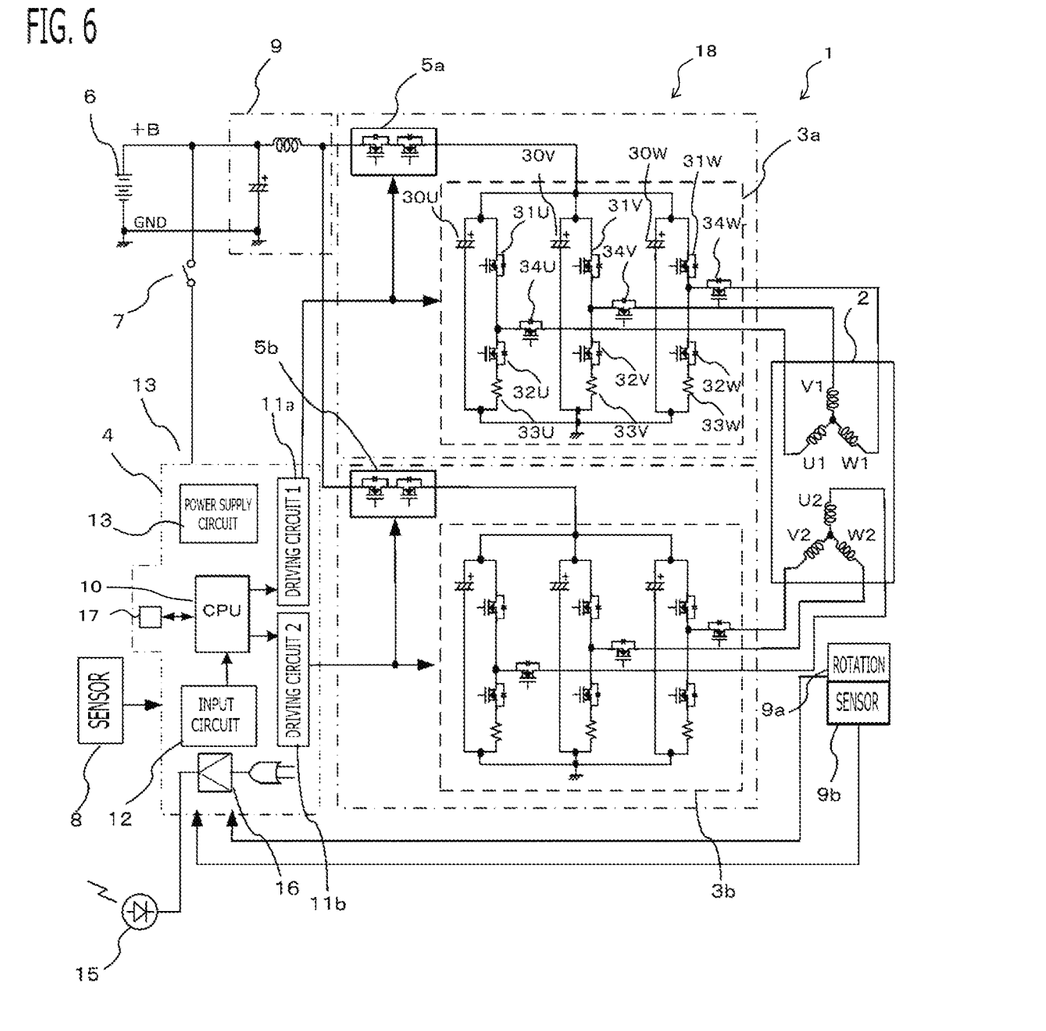
FIG. 6 is a schematic configuration diagram of an electric motor control system according to Embodiment 5.

In the present embodiment, as shown a schematic configuration diagram of the electric motor control system 1 in FIG. 6, it is a processing circuit configuration in which the first set of control system and the second set of control system were unified. As processing circuits which realizes function of the first and second motor current control units 40*a* and 40*b*, and the first and second abnormality detection units 41*a* and 41*b*, the control circuit 4 is provided with one arithmetic processor 10 (CPU) and storage apparatus 17 for the arithmetic processor 10. The first motor current control unit 40*a* and the second motor current control unit 40*b* can transmit information with each other inside the arithmetic processor 10. The control circuit 4 is provided with a first driving circuit 11*a* for the first motor current control unit 40*a*, and a second driving circuit 11*b* for the second motor current control unit 40*b*. The input circuit 12 is commonly used for the first arithmetic processor 10*a* and the second arithmetic processor 10*b*. The control circuit 4 is provided with the common informing device driving circuit 16 for driving an informing device 15.

Even if it is constituted by the one arithmetic processor 10, software of the first set of control system and software of the second set of control system are configured independently; calculation values, such as control command values, are also stored in different regions in the storage apparatus 17; and thereby a redundant system can be formed. Since the output port of the arithmetic processor 10 is divided into different ports for the first driving circuit 11*a* and for the second driving circuit 11*b*, even if one port becomes abnormal, output to the first or second driving circuit 11*a* and 11*b* can be continued by the other port. By unifying and integrating to the arithmetic processor 10, the scale of the control circuit 4 can be reduced as compared with Embodiment 1. And by eliminating the communication line 14, occurrence of communication error by noise can be prevented and reliability can be strengthened.

Figure 7:
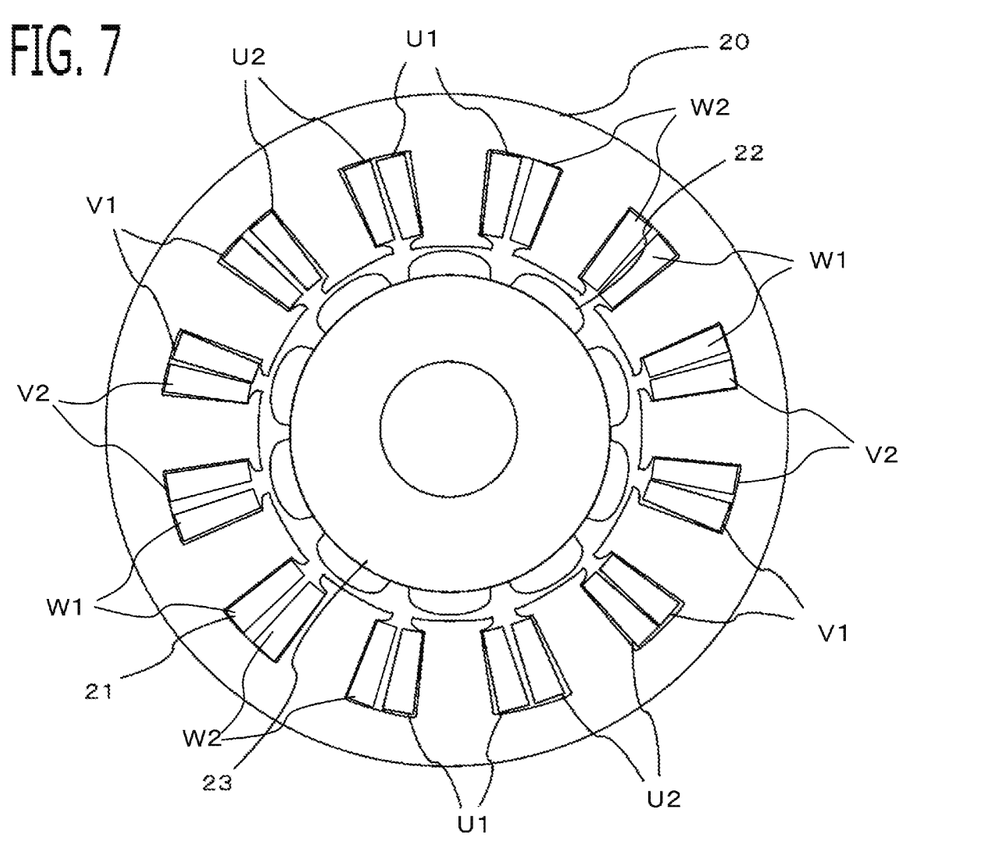
FIG. 7 is a cross-sectional view of an electric motor according to Embodiment 5.

FIG. 7 shows a cross-sectional view cut by a plane perpendicular to an axial direction of the electric motor 2 according to the present embodiment. The stator 20 is constituted by laminating thin steel plates in which a plurality of slots 21 (in this example, 12 slots) (teeth) are arranged circumferentially. The rotor 23 is concentrically arranged in the radial-direction inner side of this stator 20. At the outer peripheral part of the rotor 23, the permanent magnets 22 are arranged in order of N pole and S pole in the peripheral direction (in this example, 10 poles).

The winding of one phase is wound around each tooth of the stator 20. Each of the first set of windings and the second set of windings is wound around tooth adjacent to each other. Specifically, the winding of first set of U phase (U1) is wound around a predetermined tooth, and then is wound around the 6th tooth. Around the tooth adjacent to the first set of U phase (U1), the winding of the second set of U phase (U2) is wound; around the tooth adjacent to U2, the winding of the first set of V phase (V1) is wound; around the tooth adjacent to V1, the winding of the second set of V phase (V2) is wound; around the tooth adjacent to V2, the winding of the first set of W phase (W1) is wound; and around the tooth adjacent to W1, the winding of the second set of W phase (W2) is wound. In this way, the windings are wound regularly. Thus, 2 sets of the windings are alternately wound in the peripheral direction, and are concentrated winding with a preliminarily set phase difference (in this example, 30 degrees).

Figure 8:
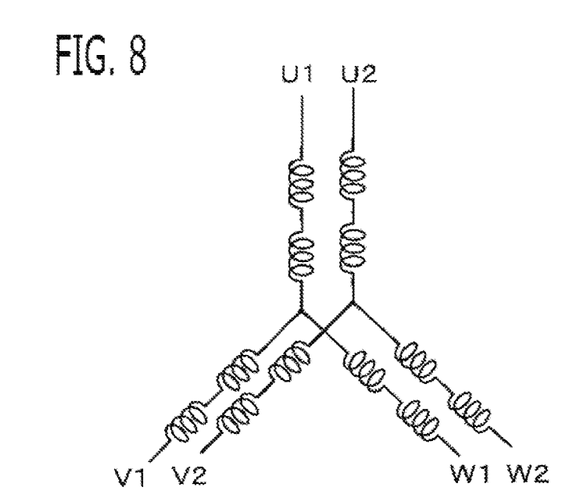
FIG. 8 is a FIG. for explaining a winding connection according to Embodiment 5.

As shown in FIG. 8, each set of windings are connected so that the end of each phase winding becomes star connection. There are three ends of windings in each set, and three ends of each set are connected to the corresponding set of inverter 3*a* and 3*b* independently (in this example, switching devices 34 for motor relay). Although 2 sets of the windings are distributed in the peripheral direction of one stator, it may be so-called a tandem type motor which arranges a stator equipped with the first set of windings and a stator equipped with the second set of windings in series for one rotor.

When the supply current to the windings of the abnormality occurrence set is set to 0, since in concentrated winding, each of the first set of windings and the second set of windings is wound around different tooth with each other, a magnetic coupling between the abnormal set and the normal set, that is, mutual inductance, becomes small, and the electromotive force to the abnormal set by the supply current to the normal set becomes small. Therefore, there is an advantage that an overload voltage applied to the abnormal set becomes small. Therefore, while keeping the overload voltage to the abnormal set small, torque can be increased. Although the concentrated winding of 10 poles 12 slots was explained in the present embodiment, not only 10 poles 12 slots but other number of poles and other number of slots may be employed.

Embodiment 6

Figure 9:
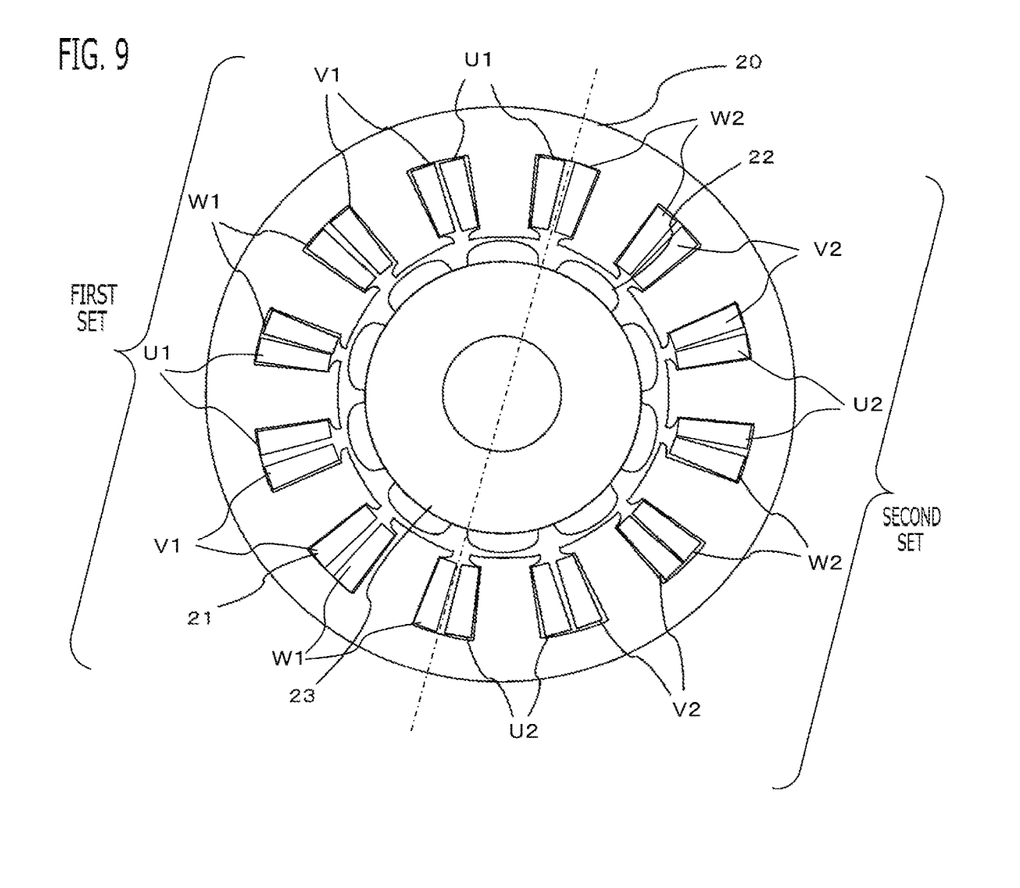
FIG. 9 is a cross-sectional view of an electric motor according to Embodiment 6.

The electric motor control system 1 according to Embodiment 6 will be explained. The explanation for constituent parts the same as those in Embodiment 1 will be omitted. The basic configuration of the electric motor control system 1 according to the present embodiment is the same as that of Embodiment 1; however, Embodiment 6 is different from Embodiment 1 in the winding method, FIG. 9 shows a cross-sectional view cut by a plane perpendicular to an axial direction of the electric motor 2 according to the present embodiment. It is concentrated winding of 10 poles 12 slots, as is the case with Embodiment 5. However, unlike Embodiment 5, it is concentrated winding in which 2 sets of the windings are divided into two in a peripheral direction and wound. The first set of windings is wound around six teeth of the left-hand side in FIG. 9, and the second set of windings is wound around six teeth of the right-hand side in FIG. 9.

By arranging each set of the windings in this way, the 30 degrees phase difference control shown in Embodiment 1, and the countermeasure against interference between winding sets becomes unnecessary. Consequently, it becomes unnecessary to synchronize strictly between the first and second motor current control units 40*a* and 40*b*. Although the whole stator 20 was divided into two in the peripheral direction and each was distributed to each set of the windings, the whole stator 20 may be divided into four in the peripheral direction and each may be distributed to each set of the windings. It may be delta connection.

Embodiment 7

The electric motor control system 1 according to Embodiment 7 will be explained. The explanation for constituent parts the same as those in Embodiment 1 will be omitted. The basic configuration of the electric motor control system 1 according to the present embodiment is the same as that of Embodiment 1; however, Embodiment 7 is different from Embodiment 1 in a setting method of conduction phase at the time of abnormality occurrence.

In the present embodiment, when abnormality occurs and the supply current to the normal set of the windings is increased up to irreversible current, the motor current control units 40*a* and 40*b* set conduction phase to a phase in which torque becomes the maximum, That is, the maximum torque current control is performed also at the time of abnormality occurrence. Conduction states to each set of the windings are different between the normal time and the time of abnormality occurrence. But, by setting to the current phase in which torque becomes the maximum at both times, the assist torque of the electric motor 2 can be increased to the maximum degree also at the time of abnormality occurrence.

Embodiment 8

The electric motor control system 1 according to Embodiment 8 will be explained. In the present embodiment, each set of the windings uses a winding in which resin layer is formed on its surface, According to this configuration, when the supply current to the normal set of the windings is increased up to irreversible current, a temperature rise of winding can be suppressed, Various modifications and alterations of this disclosure will be apparent to those skilled in the art without departing from the scope and spirit of this disclosure, and it should be understood that this is not limited to the illustrative embodiments set forth herein.

INDUSTRIAL APPLICABILITY

The present disclosure can be preferably used for an electric motor control system including an electric motor which is provided with a stator equipped with 2 sets of plural phase windings and a rotor equipped with a permanent magnet and drives a steering mechanism of a vehicle, and a controller which controls the electric motor, and an electric power steering apparatus therewith.

REFERENCE SIGNS LIST

1 Electric Motor Control System, 2 Electric Motor, 3*a*, 3*b* Inverter, 18 Controller, 10*a* First Arithmetic Processor, 10*b* Second Arithmetic Processor, 20 Stator, 22 Permanent Magnet, 23 Rotor, 31, 32 Switching Device, 34 Relay Circuit

What is claimed is:

1. An electric motor control system comprising:
an electric motor which drives a steering mechanism of a vehicle, and
a main controller which controls the electric motor,
wherein the electric motor is provided with a stator equipped with two sets of plural phase windings, and a rotor equipped with a permanent magnet, and
wherein the main controller is provided with two sub-controllers which each controls a supply current to a different set of the windings;
when both sets of the windings and the sub-controllers are normal, the controller distributes and supplies current to the two sets of the windings; and
when abnormality occurs in one set of the windings and a corresponding sub-controller, the main controller sets the supply current to 0 to all phase windings or part of the phase windings of an abnormality occurrence set, and increases the supply current to a normal set of the windings to reach a demagnetizing current which is preliminarily set so as to increase an irreversible demagnetizing factor of the permanent magnet to a value greater than 0.

2. The electric motor control system according to claim 1, wherein when abnormality occurs, after increasing the supply current to the normal set of the windings up to the demagnetizing current, the controller decreases the supply current gradually.

3. The electric motor control system according to claim 2, wherein after decreasing gradually the supply current to the normal set of the windings, the controller permits increasing the supply current up to the demagnetizing current again.

4. The electric motor control system according to claim 2, wherein after decreasing gradually the supply current to the normal set of the windings, the controller prohibits increasing the supply current up to the demagnetizing current again.

5. The electric motor control system according to claim 1, wherein when abnormality occurs, the controller does not restart the electric motor control system again, after the electric motor control system stops once.

6. The electric motor control system according to claim 1, wherein when abnormality occurs, the controller turns off all phase or partial phase switching devices which the sub-controller of the abnormality occurrence set has, or sets 0 to current command values to all phase or partial phase windings of the abnormality occurrence set, or turns off relay circuits provided on connection lines connected to respective phase windings of the abnormality occurrence set.

7. The electric motor control system according to claim 1, wherein in the electric motor, the two sets of the windings are alternately wound in a peripheral direction, and are distributed winding or concentrated winding with a preliminarily set phase difference.

8. The electric motor control system according to claim 1, wherein in the electric motor, the two sets of the windings are divided into two in a peripheral direction and wound, and are distributed winding or concentrated winding.

9. The electric motor control system according to claim 1, wherein when abnormality occurs, the controller informs that abnormality of one set occurred.

10. The electric motor control system according to claim 1, wherein one of the sub-controllers is provided with a first arithmetic processor that controls the supply current to first set of the windings, and another of the sub-controllers is provided with a second arithmetic processor that controls the supply current to second set of the windings, and each of the first and second arithmetic processors informs that abnormality occurred, when abnormality of own or the other arithmetic processor is detected.

11. The electric motor control system according to claim 1, wherein the sub-controller of first set of the windings and the sub-controller of second set of the windings are sub-controllers independent from each other.

12. An electric power steering apparatus comprising the electric motor control system according to claim 1.

* * * * *